(12) United States Patent
Yamazaki (10) Patent No.: US 11,584,088 B2
(45) Date of Patent: Feb. 21, 2023

(54) THREE-DIMENSIONAL SHAPING DEVICE, METHOD FOR MANUFACTURING THREE-DIMENSIONAL SHAPED OBJECT, AND INFORMATION PROCESSING DEVICE

(71) Applicant: SEIKO EPSON CORPORATION, Tokyo (JP)

(72) Inventor: Shigeru Yamazaki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/386,021

(22) Filed: Jul. 27, 2021

(65) Prior Publication Data

US 2022/0032553 A1 Feb. 3, 2022

(30) Foreign Application Priority Data

Jul. 29, 2020 (JP) ............................. JP2020-127823

(51) Int. Cl.
*B29C 64/393* (2017.01)
*B29C 64/236* (2017.01)
(Continued)

(52) U.S. Cl.
CPC .......... *B29C 64/393* (2017.08); *B29C 64/165* (2017.08); *B29C 64/236* (2017.08);
(Continued)

(58) Field of Classification Search
CPC ... B29C 64/393; B29C 64/321; B29C 64/165; B33Y 10/00; B33Y 30/00; B33Y 50/02
See application file for complete search history.

(56) References Cited

U.S. PATENT DOCUMENTS 5,303,141 A 4/1994 Batchelder et al.
2016/0325496 A1* 11/2016 De Pena ................ B33Y 10/00
(Continued)

FOREIGN PATENT DOCUMENTS

EP 1466718 A2 * 10/2004 .......... B29C 64/153
JP 2017-043805 A 3/2017
JP 2019-051555 A 4/2019

*Primary Examiner* — Yung-Sheng M Tsui
(74) *Attorney, Agent, or Firm* — Global IP Counselors, LLP (57) ABSTRACT

There is provided a three-dimensional shaping device that shapes a three-dimensional shaped object by laminating a layer. The three-dimensional shaping device includes: an ejection unit configured to eject a shaping material toward a table; a measurement unit configured to measure the shaping material at a measurement position separated from an ejection position of the ejection unit by a predetermined distance; a position changing unit configured to relatively move the ejection position and the measurement position with respect to the table; and a control unit. A movement range in which the measurement position is moved is wider than a shaping region where the shaping material is deposited on the table. The control unit is configured to perform a measurement of a measurement value by the measurement unit at least in a region where the movement range and the shaping region overlap each other, and control the ejection unit and the position changing unit to shape the three-dimensional shaped object in accordance with the measurement value.

8 Claims, 8 Drawing Sheets

(51) Int. Cl.
  *B29C 64/165* (2017.01)
  *B29C 64/321* (2017.01)
  *B33Y 50/02* (2015.01)
  *B33Y 10/00* (2015.01)
  *B33Y 30/00* (2015.01)

(52) U.S. Cl.
  CPC ............ *B29C 64/321* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 2017/0056974 A1 | 3/2017 | Miyashita et al. | |
| 2018/0215104 A1* | 8/2018 | Rubio | B33Y 40/00 |
| 2019/0061243 A1* | 2/2019 | Saito | B29B 7/826 |
| 2020/0262153 A1* | 8/2020 | Arao | B29C 64/118 |
| 2020/0276664 A1 | 9/2020 | Sato et al. | |
| 2020/0406554 A1* | 12/2020 | Belorustsev | B29C 64/277 |
| 2021/0162662 A1* | 6/2021 | Kothari | B22F 12/53 |
| 2021/0308951 A1* | 10/2021 | Feffer | B29C 64/112 |

* cited by examiner

THREE-DIMENSIONAL SHAPING DEVICE, METHOD FOR MANUFACTURING THREE-DIMENSIONAL SHAPED OBJECT, AND INFORMATION PROCESSING DEVICE

The present application is based on, and claims priority from JP Application Serial Number 2020-127823, filed Jul. 29, 2020, the disclosure of which is hereby incorporated by reference herein in its entirety.

BACKGROUND

1. Technical Field

The present disclosure relates to a three-dimensional shaping device, a method for manufacturing a three-dimensional shaped object, and an information processing device.

2. Related Art

In a three-dimensional shaping device described in JP-A-2017-43805, a lamp that radiates heat is provided on a lamp support portion so as to evaporate a liquid component of a shaping material ejected from an ejection unit. The lamp support portion is provided with a non-contact type thermometer together with the lamp, and a temperature of a heating region of the lamp is measured. The three-dimensional shaping device controls electric power to be supplied to the lamp such that the temperature measured by the thermometer is a predetermined temperature.

In JP-A-2017-43805, although the thermometer and the lamp are provided on the same lamp support portion, a position where the thermometer is provided and a position where the ejection unit is provided are separated from each other. Therefore, there is a difference between a region where the shaping material is ejected from the ejection unit and a region where the temperature is measured by the thermometer, which may affect shaping accuracy. Such a problem is a common problem not only in a three-dimensional shaping device in which a material is heated after being ejected as in JP-A-2017-43805, but also in a three-dimensional shaping device in which a pre-melted material is ejected from an ejection unit.

SUMMARY

According to a first aspect of the present disclosure, there is provided a three-dimensional shaping device that shapes a three-dimensional shaped object by laminating a layer. The three-dimensional shaping device includes: an ejection unit configured to eject a shaping material toward a table; a measurement unit configured to measure the shaping material at a measurement position separated from an ejection position of the ejection unit by a predetermined distance; a position changing unit configured to relatively move the ejection position and the measurement position with respect to the table; and a control unit. A movement range in which the measurement position is moved is wider than a shaping region where the shaping material is deposited on the table. The control unit is configured to perform a measurement of a measurement value by the measurement unit at least in a region where the movement range and the shaping region overlap each other, and control the ejection unit and the position changing unit to shape the three-dimensional shaped object in accordance with the measurement value.

According to a second aspect of the present disclosure, there is provided a method for manufacturing a three-dimensional shaped object by a three-dimensional shaping device. The three-dimensional shaping device includes: an ejection unit configured to eject a shaping material toward a table; a measurement unit configured to measure the shaping material at a measurement position separated from an ejection position of the ejection unit by a predetermined distance; and a position changing unit configured to relatively move the ejection position and the measurement position with respect to the table. The method for manufacturing a three-dimensional shaped object includes: making a movement range in which the measurement position is moved wider than a shaping region where the shaping material is deposited on the table; performing a measurement of a measurement value by the measurement unit at least in a region where the movement range and the shaping region overlap each other; and controlling the ejection unit and the position changing unit to shape the three-dimensional shaped object in accordance with the measurement value.

According to a third aspect of the present disclosure, there is provided an information processing device that generates data to be used by a three-dimensional shaping device. The three-dimensional shaping device includes: an ejection unit configured to eject a shaping material toward a table; a measurement unit configured to measure the shaping material at a measurement position separated from an ejection position of the ejection unit by a predetermined distance; and a position changing unit configured to relatively move the ejection position and the measurement position with respect to the table. The information processing device includes a data generation unit configured to generate shaping data representing a movement path of the ejection position such that the measurement unit is able to perform a measurement of a measurement value at least in a region where a movement range, in which the movement position is moved, and a shaping region, where the shaping material is deposited on the table, overlap each other, the movement range being wider than the shaping region.

DESCRIPTION OF EXEMPLARY EMBODIMENTS

A. First Embodiment

Figure 1:
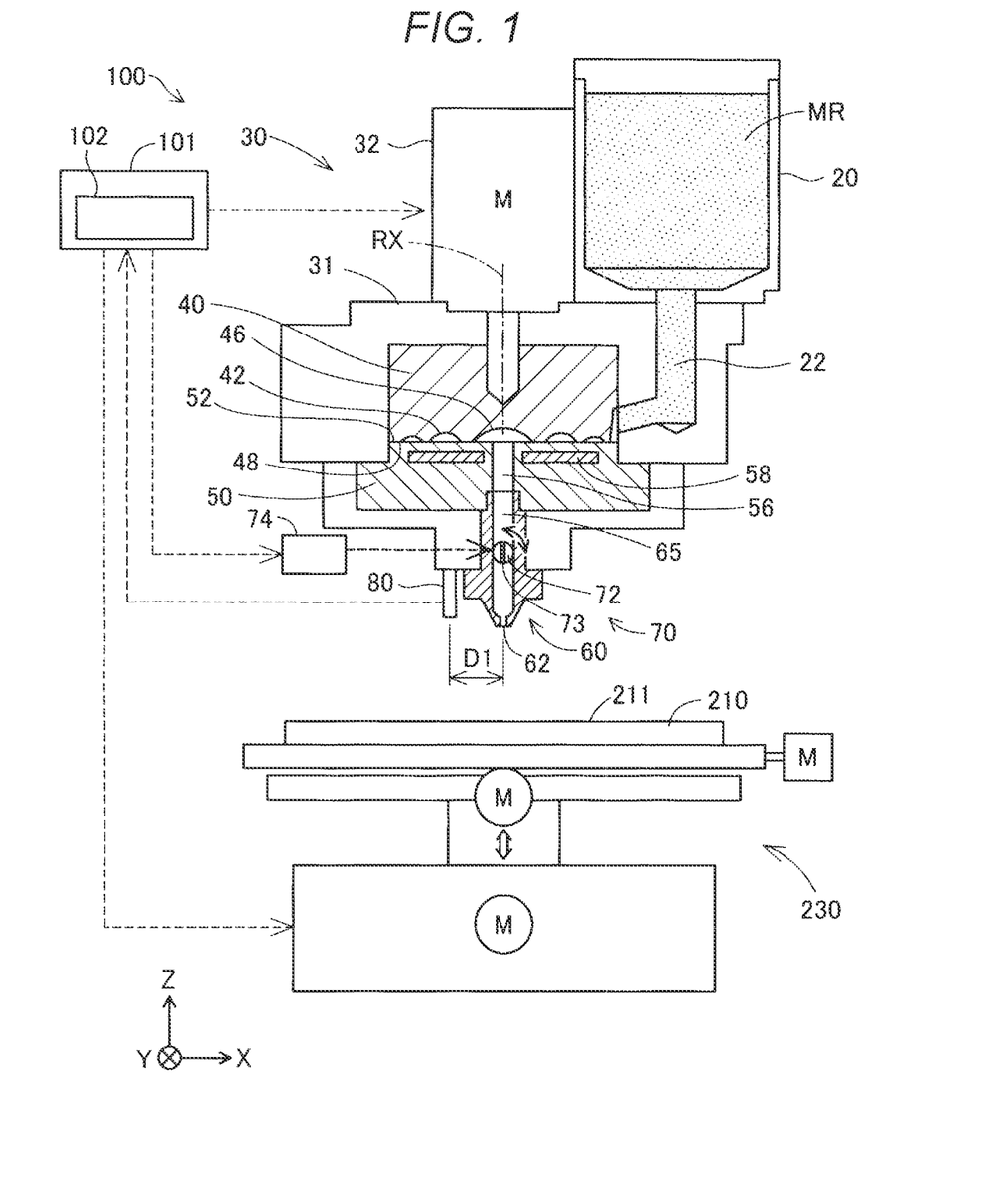
FIG. 1 is an explanatory diagram showing a schematic configuration of a three-dimensional shaping device.

FIG. 1 is an explanatory diagram showing a schematic configuration of a three-dimensional shaping device 100 according to a first embodiment. FIG. 1 shows arrows indicating X, Y, and Z directions that are orthogonal to one another. The X direction and the Y direction are directions parallel to a horizontal plane, and the Z direction is a direction opposite from a direction of gravity. The arrows indicating the X, Y, and Z directions are also appropriately shown in other figures such that the shown directions correspond to those in FIG. 1. In the following description, when a direction is specified, "+" indicates a positive direction and "−" indicates a negative direction, and positive and negative symbols are used together to indicate directions.

The three-dimensional shaping device 100 is a device that shapes a three-dimensional shaped object by laminating layers. The three-dimensional shaping device 100 includes: a table 210 for shaping which is a base of a three-dimensional shaped object; an ejection unit 60 that ejects a shaping material toward the table 210; a measurement unit 80 that is provided at a position separated from the ejection unit 60 by a certain distance; a position changing unit 230 that relatively moves the ejection unit 60 and the measurement unit 80 with respect to the table 210; and a control unit 101 that controls the three-dimensional shaping device 100. Further, the three-dimensional shaping device 100 includes a material supply unit 20 that is a supply source of a material before the material is converted into a shaping material, and a plasticizing unit 30 that plasticizes at least a part of the material to convert the material into the shaping material and supplies the shaping material to the ejection unit 60.

The material supply unit 20 supplies a raw material MR for generating the shaping material to the plasticizing unit 30. The material supply unit 20 is implemented by, for example, a hopper that accommodates the raw materials MR. The material supply unit 20 has a discharge port on a lower side. The discharge port is coupled to the plasticizing unit 30 via a communication passage 22. The raw material MR is put into the material supply unit 20 in a form of pellets, powder, or the like. In the present embodiment, a pellet-shaped ABS resin material is used.

The plasticizing unit 30 plasticizes the raw material MR supplied from the material supply unit 20 to generate a paste-shaped shaping material exhibiting fluidity, and guides the shaping material to the ejection unit 60. In the present embodiment, the term "plasticize" means that a thermoplastic material is heated so as to melt the material. The term "melt" not only refers to that the thermoplastic material is heated to a temperature equal to or higher than a melting point and becomes a liquid, but also refers to that the thermoplastic material is softened and exhibits fluidity by being heated to a temperature equal to or higher than a glass transition point.

The plasticizing unit 30 includes a screw 40, a barrel 50, a case 31, and a drive motor 32.

The screw 40 has a substantially cylindrical shape in which a height in a direction along a rotation axis RX of the screw 40 is smaller than a diameter thereof. The screw 40 is accommodated in a space surrounded by the case 31 and the barrel 50. The screw 40 has, on an end surface facing the barrel 50, a groove forming surface 48 substantially perpendicular to the rotation axis RX. The groove forming surface 48 faces a facing surface 52 of the barrel 50 substantially perpendicular to the rotation axis RX. The drive motor 32 is coupled to an opposite-side surface of the screw 40 from the groove forming surface 48. The screw 40 is rotated around the rotation axis RX by a torque generated by the drive motor 32. The drive motor 32 is driven under control of the control unit 101.

Figure 2:
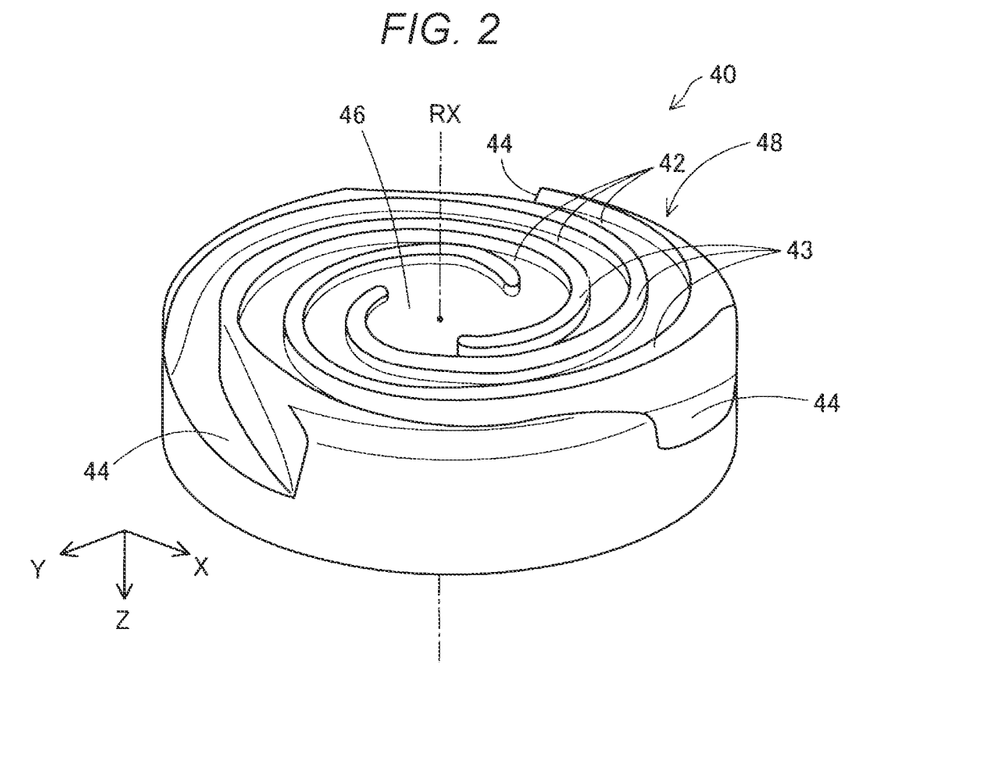
FIG. 2 is a perspective view showing a configuration of a screw on a groove forming surface side.

FIG. 2 is a perspective view showing a configuration of the screw 40 on a groove forming surface 48 side. In FIG. 2, a position of the rotation axis RX of the screw 40 is indicated by a one-dot chain line. Grooves 42 are provided in the groove forming surface 48. The screw 40 may be referred to as a "flat screw", a "rotor", or a "scroll".

The grooves 42 of the screw 40 constitute a so-called scroll groove. The groove 42 extends from a central portion 46 in a vortex shape in a manner of drawing arcs toward an outer periphery of the screw 40. The groove 42 may be configured to extend in an involute curve shape or a spiral shape. The groove forming surface 48 is provided with ridge portions 43 that constitute a side wall portion of the groove 42 and extend along each groove 42. The groove 42 is continuous up to a material introduction port 44 formed on a side surface of the screw 40. The material introduction port 44 is a portion that receives the material from the communication passage 22 into the groove 42. The material supplied from the material supply unit 20 is supplied to between the screw 40 and the barrel 50 via the communication passage 22 and the material introduction port 44.

The central portion 46 of the groove forming surface 48 is configured as a recess to which one end of the groove 42 is coupled. The central portion 46 faces a communication hole 56 provided in the facing surface 52 of the barrel 50 shown in FIG. 3. The central portion 46 intersects the rotation axis RX.

FIG. 2 shows an example of the screw 40 including three grooves 42, three ridge portions 43, and three material introduction ports 44. The number of the grooves 42, the number of ridge portions 43, and the number of material introduction ports 44 provided in the screw 40 are not limited to three. The screw 40 may be provided with only one groove 42, or may be provided with two or more grooves 42. Further, the number of ridge portions 43 and the number of material introduction ports 44 may be any number in accordance with the number of grooves 42.

Figure 3:
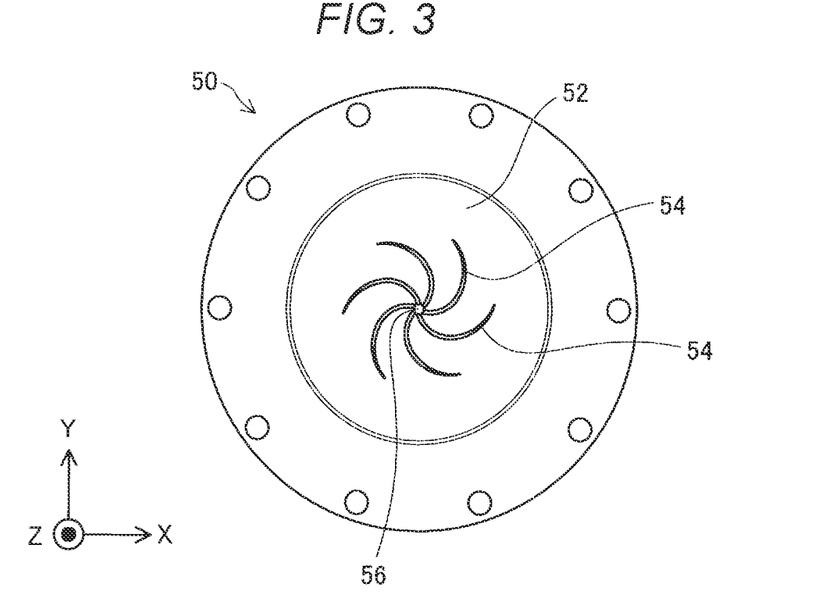
FIG. 3 is a view showing a configuration of a barrel on a facing surface side.

FIG. 3 is a view showing a configuration of the barrel 50 on the facing surface 52 side. As described above, the barrel 50 has the facing surface 52 facing the groove forming surface 48 of the screw 40. The communication hole 56 communicating with the ejection unit 60 is provided at a center of the facing surface 52. A plurality of guide grooves 54 are provided around the communication hole 56 in the facing surface 52. One end of each guide groove 54 is coupled to the communication hole 56, and each guide groove 54 extends in a vortex shape from the communication hole 56 toward an outer periphery of the facing surface 52. Each of the guide grooves 54 has a function of guiding a shaping material to the communication hole 56. Further, the guide groove 54 may not be formed.

As shown in FIG. 1, a heater 58 for heating the raw material MR supplied to the groove 42 of the screw 40 is embedded in the barrel 50. A temperature heated by the heater 58 is controlled by the control unit 101.

The ejection unit 60 includes a nozzle 62 that is opened in a −Z direction and ejects the shaping material generated by the plasticizing unit 30 toward the table 210. A position of the nozzle 62 in the X and Y directions is an ejection position at which the shaping material is ejected by the ejection unit 60. A flow path 65 through which the shaping material flows is provided between the screw 40 and the nozzle 62. The nozzle 62 communicates with the communication hole 56 of the barrel 50 through the flow path 65. The ejection unit 60 is provided with an ejection amount adjusting unit 70 that can adjust an opening degree of the flow path 65.

In the present embodiment, the ejection amount adjusting unit 70 is implemented by a butterfly valve. The ejection amount adjusting unit 70 includes a drive shaft 72 that is a shaft-shaped member extending in one direction, a valve body 73 that is rotated by rotation of the drive shaft 72, and a valve drive unit 74 that generates a rotational drive force of the drive shaft 72.

The drive shaft 72 is attached in a middle of the flow path 65 so as to intersect a flow direction of the shaping material. More specifically, the drive shaft 72 is attached so as to be parallel to the Y direction which is a direction perpendicular to the flow direction of the shaping material in the flow path 65. The drive shaft 72 is rotatable around a central axis along the Y direction.

The valve body 73 is a plate-shaped member that is rotated in the flow path 65. The valve body 73 is formed by, for example, processing a portion of the drive shaft 72 disposed in the flow path 65 into a plate shape. A shape of the valve body 73 when viewed in a direction perpendicular to a plate surface thereof substantially coincides with an opening shape of the flow path 65 at a portion where the valve body 73 is disposed.

The valve drive unit 74 rotates the drive shaft 72 under the control of the control unit 101. The valve drive unit 74 is implemented by, for example, a stepping motor. The valve body 73 is rotated in the flow path 65 due to the rotation of the drive shaft 72.

A state where the plate surface of the valve body 73 is perpendicular to the flow direction of the shaping material in the flow path 65 is a state where the flow path 65 is closed. In this state, inflow of the shaping material from the flow path 65 to the nozzle 62 is blocked, and outflow of the shaping material from the nozzle 62 is stopped. When the plate surface of the valve body 73 is rotated from the perpendicular state due to the rotation of the drive shaft 72, the inflow of the shaping material from the flow path 65 to the nozzle 62 is allowed, and the shaping material of an ejection amount corresponding to a rotation angle of the valve body 73 flows out from the nozzle 62. As shown in FIG. 1, a state where the plate surface of the valve body 73 is along the flow direction of the shaping material in the flow path 65 is a state where the flow path 65 is fully opened. In this state, the ejection amount of the shaping material per unit time from the nozzle 62 is maximized. In this manner, the ejection amount adjusting unit 70 can implement ON/OFF of outflow of the shaping material and adjustment of the ejection amount of the shaping material.

The table 210 is disposed at a position facing the ejection unit 60. In the first embodiment, a shaping surface 211 of the table 210 facing the ejection unit 60 is disposed parallel to the X and Y directions, that is, the horizontal direction. In three-dimensional shaping processing to be described later, the three-dimensional shaping device 100 shapes a three-dimensional shaped object by ejecting the shaping material from the ejection unit 60 toward the shaping surface 211 of the table 210 and laminating layers.

The position changing unit 230 changes a relative position between the table 210 and the ejection unit 60. In the first embodiment, a position of the ejection unit 60 is fixed, and the position changing unit 230 moves the table 210. The position changing unit 230 is implemented by a three-axis positioner that moves the table 210 in three axial directions including the X, Y, and Z directions by driving forces of three motors M. The position changing unit 230 changes a relative positional relation between the ejection unit 60 and the table 210 under the control of the control unit 101. In the present specification, unless otherwise specified, movement of the ejection unit 60 means that the nozzle 62 of the ejection unit 60 is relatively moved with respect to the table 210.

In another embodiment, instead of a configuration in which the position changing unit 230 moves the table 210, the position changing unit 230 may move the nozzle 62 in a state where the position of the table 210 is fixed. In addition, the position changing unit 230 may move the table 210 in the Z direction, and move the nozzle 62 in the X and Y directions. Alternatively, the position changing unit 230 may move the table 210 in the X and Y directions, and may move the nozzle 62 in the Z direction.

The measurement unit 80 is provided in a vicinity of the nozzle 62. The measurement unit 80 according to the present embodiment is a non-contact type temperature sensor. The measurement unit 80 measures a temperature of the shaping material ejected to the table 210. A measurement value measured by the measurement unit 80 is acquired by the control unit 101. In the present embodiment, the measurement unit 80 is disposed offset to a −X direction side with respect to the nozzle 62, and the measurement unit 80 and the nozzle 62 are separated by a distance D1 in the X direction. That is, in the X and Y directions, a measurement position at which a measurement is performed by the measurement unit 80 is separated from an ejection position of the ejection unit 60 by a certain distance. When the position changing unit 230 relatively moves the nozzle 62 with respect to the table 210, the measurement unit 80 is also relatively moved with respect to the table 210 while maintaining a state of being separated from the nozzle 62 by the distance D1 in the X direction. Therefore, when the nozzle 62 is moved in the +X direction, the measurement unit 80 can measure a temperature of the shaping material immediately after the shaping material is ejected from the nozzle 62 and landed on the table 210. In the following description, a movement of the measurement unit 80 means a relative movement of the measurement position with respect to the table 210, and a movement of the ejection unit 60 or the nozzle 62 means a relative movement of the ejection position with respect to the table 210. A position of the measurement unit 80 is the measurement position, and a position of the ejection unit 60 or the nozzle 62 is the ejection position.

The control unit 101 is a control device that controls an overall operation of the three-dimensional shaping device 100. The control unit 101 is implemented by a computer including one or a plurality of processors, a main storage device, and an input and output interface that inputs and outputs a signal to and from an outside. In addition to a function of serving as a data generation unit 102, the control unit 101 performs various functions by the processor executing a program or an instruction read on the main storage device. Instead of being implemented by a computer, the control unit 101 may be implemented by a configuration in which a plurality of circuits are combined in order to implement at least a part of the functions. The control unit 101 is also referred to as an information processing device.

The data generation unit 102 generates shaping data for ejecting the shaping material from the ejection unit 60 while moving the ejection unit 60 and the measurement unit 80 by the position changing unit 230. The control unit 101 controls the ejection unit 60 and the position changing unit 230 according to the shaping data generated by the data generation unit 102 to shape a three-dimensional shaped object on the table 210.

The data generation unit 102 generates shaping data by using shape data such as three-dimensional CAD data representing a shape of the three-dimensional shaped object. The shaping data includes a plurality of continuous path data representing a movement path of the ejection unit 60. The path data includes coordinate data indicating a start point and an end point of the path. Further, the path data includes speed data indicating a moving speed of moving on the path and ejection amount data indicating an amount of the shaping material ejected on the path, which are associated with each other. When the ejection amount of the shaping material is constant, a line width of the shaping material ejected onto the table 210 is increased when the moving speed of the ejection unit 60 is decreased, and the line width is decreased when the moving speed is increased. In addition, when the moving speed of the ejection unit 60 is constant, the line width is increased when the ejection amount of the shaping material is increased, and the line width is decreased when the ejection amount is decreased. The ejection amount of the shaping material may be represented as an ejection amount per unit area or may be represented as an absolute amount per path.

Figure 4:
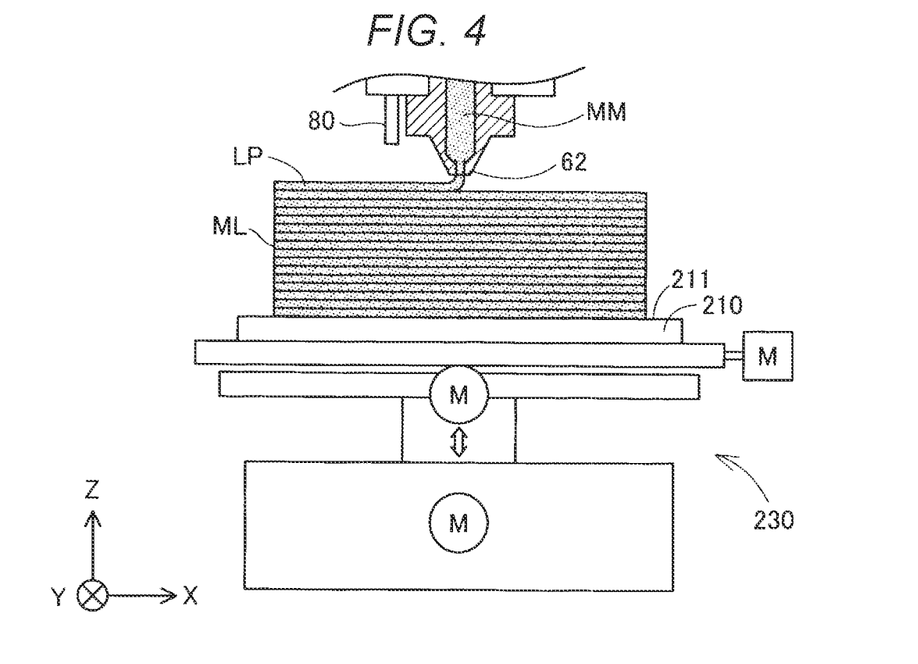
FIG. 4 is a diagram schematically showing a state where a three-dimensional shaped object is being shaped.

FIG. 4 is a diagram schematically showing a state where a three-dimensional shaped object is being shaped in the three-dimensional shaping device 100. In the three-dimensional shaping device 100, as described above, in the plasticizing unit 30, the solid raw material MR supplied to the grooves 42 of the rotating screw 40 is melted to generate a shaping material MM. The control unit 101 keeps a distance between the shaping surface 211 of the table 210 and the nozzle 62 and ejects the shaping material MM from the nozzle 62 while changing the position of the nozzle 62 with respect to the table 210 in a direction along the shaping surface 211 of the table 210. The shaping material MM ejected from the nozzle 62 is continuously deposited in a moving direction of the nozzle 62. By such scanning performed by the nozzle 62, a linear portion LP linearly extending along a scanning path of the nozzle 62 is formed.

The control unit 101 repeats the scanning performed by the nozzle 62 to form a layer ML. After forming one layer ML, the control unit 101 moves the position of the nozzle 62 with respect to the table 210 in the Z direction. Then, the three-dimensional shaped object is shaped by further laminating a layer ML on the layer ML formed so far.

For example, when the nozzle 62 is moved in the Z direction when deposition of one layer ML is completed, a case where a discontinuous path is formed, or the like, the control unit 101 may temporarily interrupt ejection of the shaping material from the nozzle 62. In this case, the control unit 101 closes the flow path 65 by the valve body 73 of the ejection amount adjusting unit 70 to stop the ejection of the shaping material MM from the nozzle 62. After changing the position of the nozzle 62, the control unit 101 opens the flow path 65 by the valve body 73 of the ejection amount adjusting unit 70 to restart the deposition of the shaping material MM from a changed position of the nozzle 62.

Figure 5:
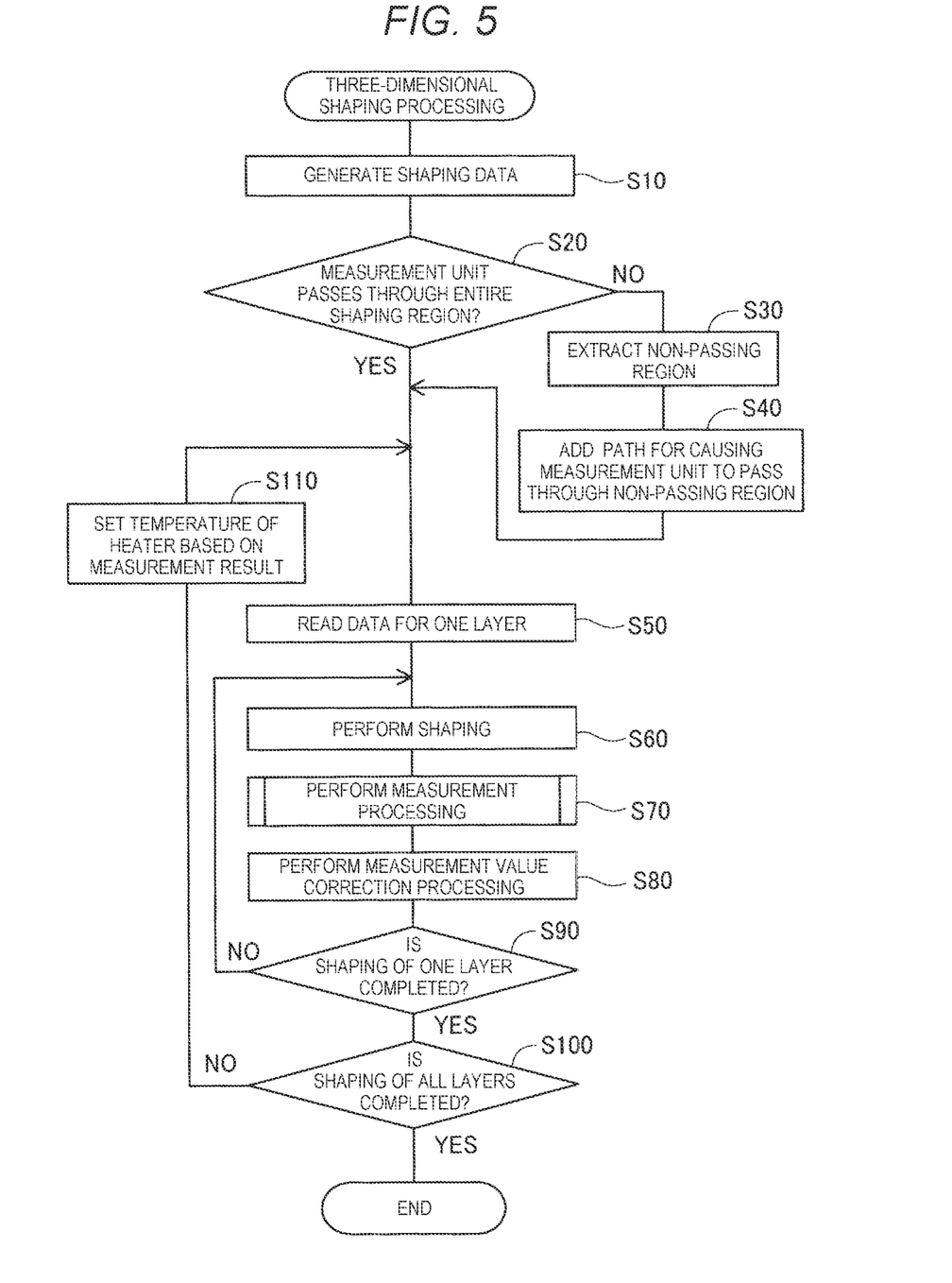
FIG. 5 is a flowchart of three-dimensional shaping processing.

FIG. 5 is a flow chart of the three-dimensional shaping processing executed by the control unit 101. The flow chart shows a method for manufacturing a three-dimensional shaped object by the three-dimensional shaping device 100.

In step S10, the data generation unit 102 generates the shaping data. For example, the data generation unit 102 analyzes the three-dimensional CAD data representing the shape of the three-dimensional shaped object received from the outside, and slices the three-dimensional shaped object into a plurality of layers along an XY plane. Then, for each layer, shaping data including a path representing an outline of the layer and a path filling an inside of the outline is generated. The shaping data of each layer is also referred to as slice data.

In step S20, the control unit 101 analyzes the shaping data generated in step S10 for each layer, and determines whether the measurement unit 80 passes through an entire shaping region where the shaping material is deposited on the table based on the shaping data. More specifically, the control unit 101 obtains, based on a shaping region where the shaping material is deposited, a movement range in which the measurement unit 80 is moved, compares the shaping region with the movement range of the measurement unit 80, and determines that the measurement unit 80 passes through the entire shaping region when an entire movement range of the measurement unit 80 is included in the shaping region. Hereinafter, the movement range in which the measurement unit 80 is moved is referred to as a "measurement unit movement range".

Figure 6:
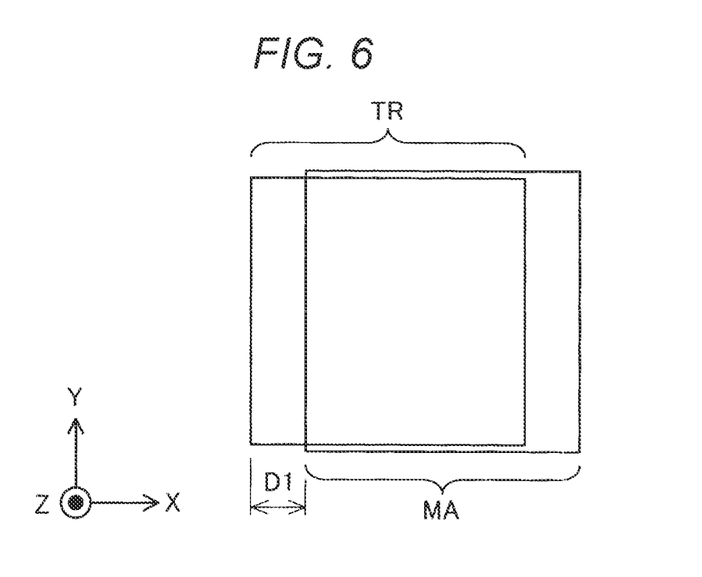
FIG. 6 is a diagram showing a shaping region and a measurement unit movement range.

FIG. 6 is a diagram showing a shaping region MA and a measurement unit movement range TR. FIG. 6 shows the shaping region MA and the measurement unit movement range TR when the table 210 is viewed from the ejection unit 60. In the present embodiment, the measurement unit 80 is separated from the nozzle 62 by the distance D1 in the −X direction. Therefore, the measurement unit movement range TR is a range obtained by shifting the shaping region MA by the distance D1 in the −X direction, and the measurement unit 80 does not pass through the entire shaping region MA. In FIG. 6 and subsequent figures, a size of the measurement unit movement range TR is displayed slightly smaller so as to make it easier to understand a range of the shaping region MA and a range of the measurement unit movement range TR.

When it is determined in step S20 in FIG. 5 that the measurement unit 80 does not pass through the entire shaping region MA, the control unit 101 extracts, from the shaping region MA, a non-passing region through which the measurement unit 80 does not pass in step S30. When it is determined in step S20 that the measurement unit 80 passes through the entire shaping region MA, the control unit 101 skips processing in step S30 and step S40 to be described later.

Figure 7:
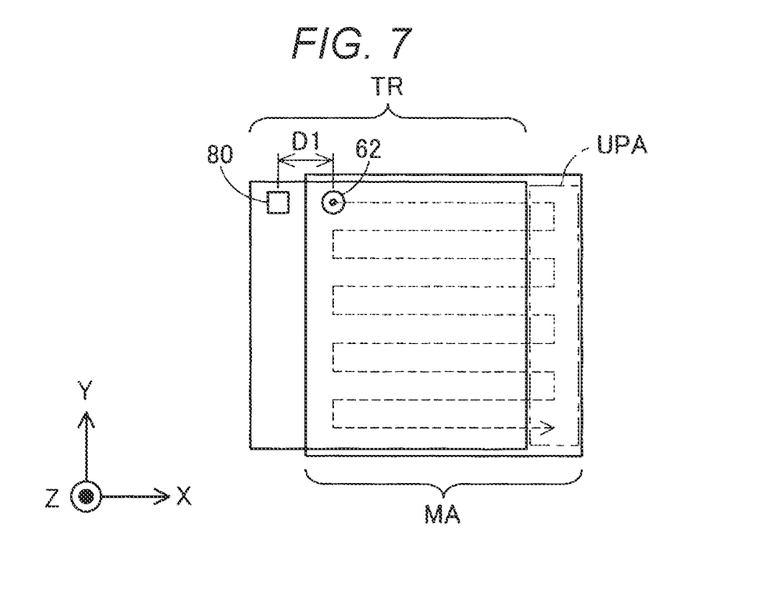
FIG. 7 is a diagram showing a non-passing region through which a measurement unit does not pass.

FIG. 7 is a diagram showing a non-passing region UPA through which the measurement unit 80 does not pass. FIG. 7 also shows a positional relation between the nozzle 62 and the measurement unit 80. In FIG. 7, a path along which the nozzle 62 is moved is indicated by a broken line. As shown in FIG. 7, in the present embodiment, the measurement unit 80 is located on the −X direction side of the nozzle 62. Therefore, the measurement unit 80 does not pass through a region having a width corresponding to the distance D1 at a right end of the shaping region MA. Therefore, the control unit 101 extracts, as the non-passing region UPA, the region having the width corresponding to the distance D1 at the right end of the shaping region MA. In the present embodiment, the control unit 101 extracts, as the non-passing region UPA, a region of the shaping region MA in which the ejection unit 60 is not moved in the +X direction at the time of shaping, that is, a region of the shaping region MA in which the measurement unit 80 is not positioned behind the ejection unit 60 at the time of shaping, in addition to the region having the width corresponding to the distance D1 at the right end of the shaping region MA.

In step S40 in FIG. 5, the control unit 101 adds, to the shaping data, a path of the nozzle 62 for causing the measurement unit 80 to pass through the non-passing region UPA extracted in step S30, thereby enlarging the measurement unit movement range TR to be larger than the shaping region MA.

Figure 8:
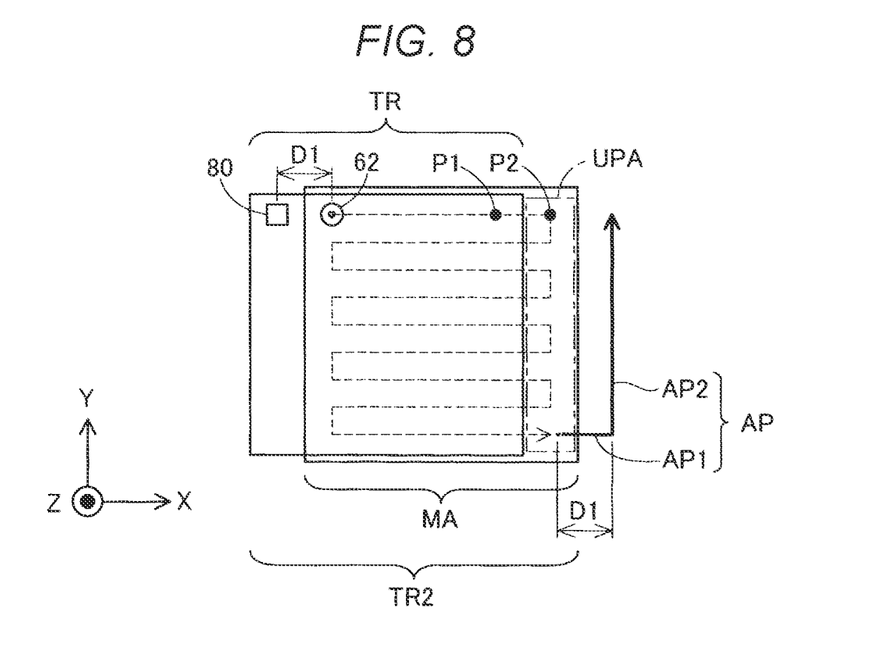
FIG. 8 is a diagram showing an additional path for causing the measurement unit to pass through the non-passing region.

FIG. 8 is a diagram showing an additional path AP for causing the measurement unit 80 to pass through the non-passing region UPA. The shaping region MA and the measurement unit movement range TR shown in FIG. 8 are rectangular regions. Therefore, the non-passing region UPA is a region elongated along the Y direction at an end portion of the shaping region MA on the +X direction side. Therefore, the control unit 101 adds, to the shaping data, the additional path AP including a path AP1 extending from an end point of the existing path by the distance D1 between the nozzle 62 and the measurement unit 80 in the +X direction and a path AP2 extending in the +Y direction from an end point of the path AP1 in order to make the measurement unit 80 pass through the region elongated along the Y direction. As described above, by adding the additional path AP to the path data, the measurement unit movement range TR becomes wider than an initial range thereof and includes the shaping region MA. The widened measurement unit movement range is shown as a measurement unit movement range TR2 in FIG. 8. In the following description, unless otherwise specified, the measurement unit movement range TR refers to the measurement unit movement range TR2 in FIG. 8. The control unit 101 sets the ejection amount of the shaping material on the additional path AP to zero. Thus, in the additional path AP, the shaping material is not ejected, and only the measurement of the non-passing region UPA can be performed. As described above, the additional path AP is preferably added so as to be continuous with an end of the path in the layer.

In step S50 in FIG. 5, the control unit 101 reads data for one layer to be formed in a first layer from the shaping data generated in step S10 or the shaping data to which the additional path AP is added in step S40.

In step S60, the control unit 101 controls the position changing unit 230 and the ejection amount adjusting unit 70 according to the data read in step S50 to deposit the shaping material on the table 210 and perform shaping.

In step S70, the control unit 101 executes measurement processing of measuring a temperature of the shaping material deposited on the table 210. The control unit 101 counts and stores a time difference from when the shaping material is ejected in step S60 to when the temperature of the shaping material is measured.

Figure 9:
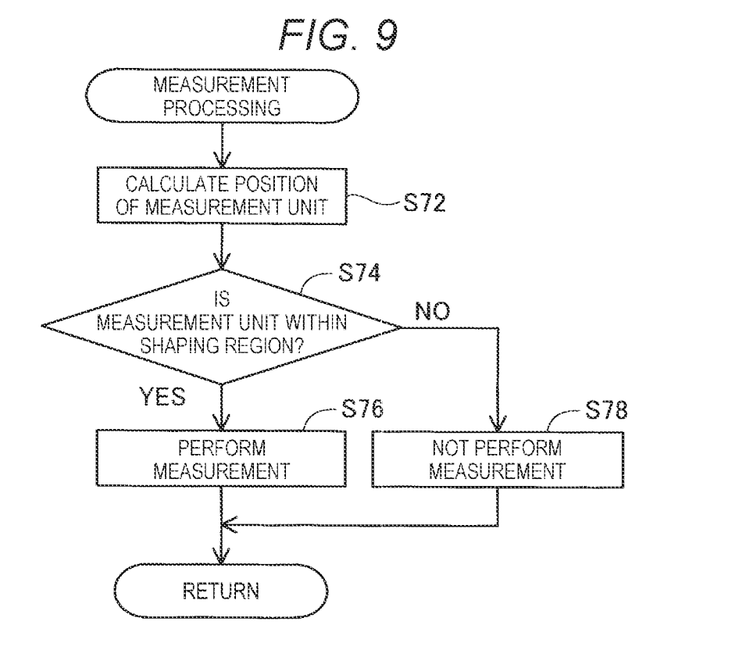
FIG. 9 is a detailed flow chart of measurement processing.

FIG. 9 is a detailed flow chart of the measurement processing. In step S72, the control unit 101 calculates a current position of the measurement unit 80. In the present embodiment, the current position of the measurement unit 80 is a position separated from a current position of the nozzle 62 by the distance D1 in the −X direction.

In step S74, the control unit 101 determines whether the calculated position of the measurement unit 80 is within the shaping region MA where the shaping material is deposited in the current layer. When it is determined that the position of the measurement unit 80 is within the shaping region MA, the control unit 101 operates the measurement unit 80 at the current position of the measurement unit 80 to measure the temperature of the shaping material in step S76. On the other hand, when it is determined that the position of the measurement unit 80 is not within the shaping region MA, the control unit 101 turns off the measurement unit 80 and does not perform the measurement of the shaping material in step S78.

Figure 10:
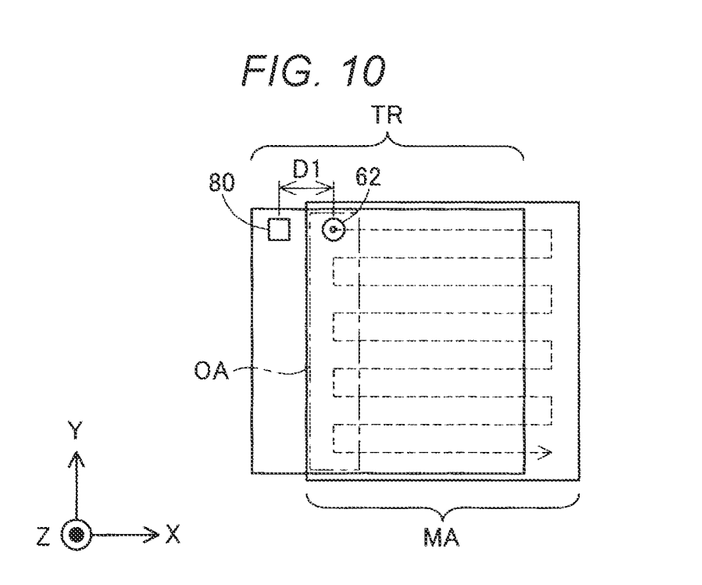
FIG. 10 is a diagram showing a region where the measurement unit is turned off.

FIG. 10 is a diagram showing a region where the measurement unit 80 is turned off in the measurement processing described above. In the present embodiment, the measurement unit 80 is disposed in the −X direction of the nozzle 62. Therefore, a range of a width D1 adjacent to a left side of the shaping region MA corresponds to the measurement unit movement range TR, and is a region where the shaping material is not deposited. Therefore, when the measurement unit 80 is located in the range in the measurement processing, the measurement unit 80 is turned off and the temperature is not measured. In FIG. 10, the range of the shaping region MA in which the measurement unit 80 is turned off is shown as a measurement unit off region OA.

In step S80 in FIG. 5, the control unit 101 executes measurement value correction processing of correcting the temperature measured by the measurement unit 80. In the measurement value correction processing, the control unit 101 corrects the measurement value in accordance with the time difference from when the shaping material is ejected from the nozzle 62 to when the ejected shaping material is measured by the measurement unit 80.

Figure 11:
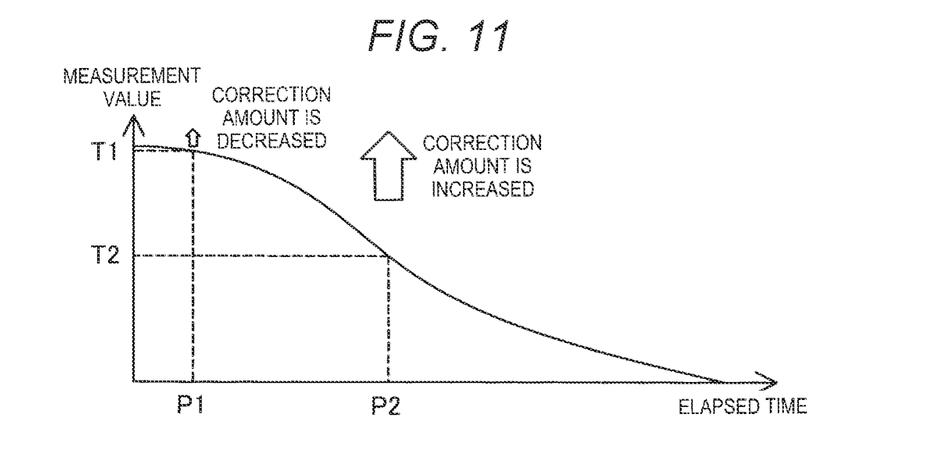
FIG. 11 is an explanatory diagram showing a method of correcting a measurement value.

FIG. 11 is an explanatory diagram showing a method of correcting the measurement value. FIG. 11 is a graph showing a change in measurement value of the temperature of the shaping material with elapse of time after the shaping material is ejected from the nozzle 62. For example, when the shaping material is ejected from the nozzle 62 at a first position P1 in FIG. 8, the measurement unit 80 reaches the first position P1 immediately thereafter and measures the temperature of the shaping material, and thus, as shown in FIG. 11, the measurement value at the first position P1 is substantially the same as the temperature of the shaping material immediately after being ejected from the nozzle 62. On the other hand, when the shaping material is ejected from the nozzle 62 at a second position P2 shown in FIG. 8, the measurement unit 80 passes through the second position P2 at a timing at which the nozzle 62 passes through the additional path AP since the second position P2 is included in the non-passing region UPA. Therefore, as shown in FIG. 11, the measurement value at the second position P2 is obtained at a timing at which the temperature of the shaping material is significantly decreased. Therefore, the control unit 101 corrects the measurement value in accordance with the time difference from when the shaping material is ejected from the nozzle 62 to when the ejected shaping material is measured by the measurement unit 80. Specifically, a correction amount is increased by multiplying an actual measurement value by a larger coefficient, as the time difference increases, and the correction amount is decreased by multiplying the actual measurement value by a smaller coefficient, as the time difference is smaller. In this way, the temperature of the shaping material can be appropriately obtained regardless of the time difference between the ejection and the measurement. The coefficient by which the measurement value is multiplied in accordance with the time difference is defined by a function or a map by performing experiments or simulations in advance. The coefficient may be determined in accordance with a type of the material, a shaping temperature, or the like.

The processing in step S70 and step S80 described above is processing which is simultaneously performed in parallel while shaping processing is performed in step S60.

In step S90 in FIG. 5, the control unit 101 determines whether the shaping of one layer is completed. When the shaping of one layer is not completed, the process returns to step S60, and the shaping of the layer is continuously performed. When the shaping of one layer is completed, the control unit 101 determines whether the shaping of all layers is completed in step S100. When it is determined that the shaping of all layers is completed, the control unit 101 ends the three-dimensional shaping processing.

When it is determined in step S100 that the shaping of all layers is not completed, the control unit 101 sets, based on a measurement result measured by the measurement unit 80, a temperature of the heater 58 at the time of shaping a next layer in step S110. For example, the control unit 101 obtains an average value of the temperatures of the shaping material in one layer which are measured by the measurement unit 80, increases the temperature of the heater 58 when the temperature is lower than a predetermined temperature, and decreases the temperature of the heater 58 when the temperature is higher than the predetermined temperature. In this way, the temperature of the shaping material can be controlled in accordance with the measurement value measured by the measurement unit 80.

After adjusting the temperature of the heater 58 in step S110, the control unit 101 returns the processing to step S50, reads the shaping data of the next layer, and repeats the processing from step S60 to step S90 to shape the layer.

According to the present embodiment described above, the control unit 101 extracts, from the shaping region MA, the non-passing region UPA through which the measurement unit 80 does not pass, and adds the additional path AP such that the measurement unit 80 passes through the non-passing region UPA, so that the measurement unit movement range TR in which the measurement unit 80 is moved is wider than the shaping region MA in which the shaping material is deposited on the table 210. Further, since the measurement unit 80 measures the measurement value at least in the region where the measurement unit movement range TR and the shaping region MA overlap each other, a region where the measurement is not performed is prevented from being generated in the shaping region MA. Therefore, it is possible to reduce the possibility that shaping accuracy is affected by a difference between the region where the shaping material is ejected from the ejection unit 60 and the region where the measurement value is measured by the measurement unit 80.

In addition, according to the present embodiment, the control unit 101 stops the measurement unit 80 to measure the measurement value in a range of the measurement unit movement range TR that does not overlap the shaping region MA. Therefore, a measurement range of the measurement unit 80 can be reduced, and a processing load related to the measurement can be reduced.

According to the present embodiment, the control unit 101 corrects the measurement value in accordance with the time difference from when the shaping material is ejected by the ejection unit 60 to when the ejected shaping material is measured by the measurement unit 80, and shapes the three-dimensional shaped object by using the corrected measurement value. Therefore, the three-dimensional shaped object can be shaped by using an appropriate measurement value. In particular, in the present embodiment, since the temperature of the shaping material is measured by the measurement unit 80 in parallel with the movement of the ejection unit 60, a shaping time can be shortened as compared with a case where the temperature of the shaping material is measured for each layer, and since a time interval between the shaping and the measurement can be reduced, the correction amount of the temperature can be minimized.

In addition, according to the present embodiment, as shown in FIG. 8, the control unit 101 controls the position changing unit 230 to move the measurement unit 80 by adding the path AP1 in accordance with the distance D1 between the ejection unit 60 and the measurement unit 80. Therefore, the measurement unit 80 can be appropriately moved in accordance with the distance D1 between the ejection unit 60 and the measurement unit 80.

In addition, according to the present embodiment, the control unit 101 controls the temperature of the shaping material to shape the three-dimensional shaped object by setting the temperature of the heater 58 in accordance with the measurement value measured by the measurement unit 80. Therefore, adhesiveness of the shaping material between the layers can be appropriately controlled. Therefore, the shaping accuracy of the three-dimensional shaped object can be improved.

B. Second Embodiment

Figure 12:
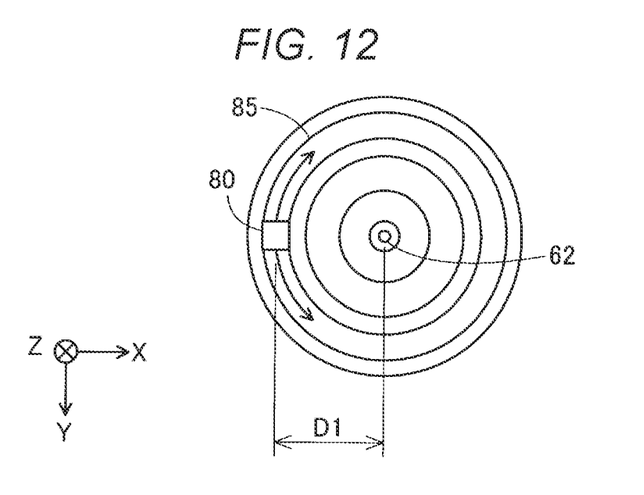
FIG. 12 is a diagram showing a nozzle and a measurement unit according to a second embodiment.

In the first embodiment described above, the measurement unit 80 is provided on a −X direction side of the nozzle 62. In contrast, in a second embodiment, the measurement unit 80 is provided so as to be rotatable around the nozzle 62.

FIG. 12 is a view of the nozzle 62 and the measurement unit 80 according to the second embodiment when viewed from a table 210 side in a +Z direction. In the present embodiment, the measurement unit 80 is attached to a ring-shaped rotating body 85, which is rotatable around the nozzle 62, at a position separated from the nozzle 62 by the distance D1. The rotating body 85 is rotated by a drive motor (not shown) coupled by a gear or a belt. A rotation operation of the measurement unit 80 performed by the rotating body 85 is controlled by the control unit 101 controlling the drive motor coupled to the rotating body 85. The rotating body 85 itself may be configured as a ring-shaped motor.

In the present embodiment, the control unit 101 rotates the rotating body 85 such that the measurement unit 80 is always positioned behind the nozzle 62 in a traveling direction. In this way, a temperature of a shaping material ejected from the nozzle 62 can be measured immediately after the ejection regardless of the traveling direction of the nozzle 62. As a result, the temperature of the shaping material can be measured with high accuracy, so that shaping accuracy of a three-dimensional shaped object can be improved.

C. Other Embodiments (C-1) In the above embodiment, the measurement unit 80 measures a temperature of a shaping material ejected by the ejection unit 60. On the other hand, the measurement unit 80 may measure a line width or an ejection amount of the shaping material ejected by the ejection unit 60. The line width can be measured by, for example, configuring the measurement unit 80 with a laser displacement sensor or an image sensor and detecting a width of the shaping material in a direction perpendicular to the traveling direction of the nozzle. The ejection amount can be measured, for example, by configuring the measurement unit 80 with a non-contact type displacement sensor and an image sensor, detecting a height and width of the shaping material and multiplying the height and the width.

In a case where the line width or the ejection amount of the shaping material is measured by the measurement unit 80, the control unit 101 may adjust a moving speed of the nozzle 62 by the position changing unit 230 such that the measured line width or ejection amount is a predetermined value. In addition, the ejection amount may be adjusted by the ejection amount adjusting unit 70 or the drive motor 32 that drives the screw 40. These adjustments may be performed in real time by executing feedback control, or may be performed at the time of shaping a next layer as in the above-described embodiment. In the above embodiment, a temperature is measured by the measurement unit 80, and a measurement result thereof is used for temperature control of the heater 58 at the time of shaping a next layer, and the temperature of the heater 58 may be controlled in real time such that the measured temperature is a predetermined temperature.

(C-2) In the above embodiment, a measurement of a measurement value performed by the measurement unit 80 is stopped in a range of the measurement unit movement range TR that does not overlap the shaping region MA. On the other hand, the measurement performed by the measurement unit 80 may not be stopped even in the range of the measurement unit movement range TR that does not overlap the shaping region MA, and the measurement may be performed as it is. In this case, it is preferable that the measurement value measured in the range of the measurement unit movement range TR that does not overlap the shaping region MA is not used in various controls.

(C-3) The measurement value correction processing performed in three-dimensional shaping processing according to the above-described embodiment may be omitted.

(C-4) In the above embodiment, the plasticizing unit 30 includes the screw 40 having the groove forming surface 48 in which the grooves 42 are formed, and the barrel 50 having the facing surface 52 facing the groove forming surface 48. On the other hand, the plasticizing unit 30 may include, for example, a cylindrical barrel and a spiral in-line screw disposed therein. In addition, for example, a head used for fused deposition modeling (FDM) may be adopted as the ejection unit 60.

(C-5) The measurement unit 80 according to the above embodiment may measure a temperature in a range wider than a diameter of the nozzle 62. In this case, for example, in the first embodiment, when the nozzle 62 is moved in a −X direction, it is possible to measure a temperature of the shaping material in an unmeasured adjacent path deposited in a path before a current path. As such a measurement unit 80, for example, thermography can be applied.

(C-6) In the first embodiment described above, the measurement unit 80 is disposed offset to a −X direction side with respect to the nozzle 62, but the measurement unit 80 may be disposed horizontally obliquely offset with respect to the nozzle 62.

(C-7) In the above embodiment, a pellet-shaped ABS resin material is used as a raw material to be supplied to the material supply unit 20. On the other hand, the three-dimensional shaping device 100 can shape a three-dimensional shaped object using various materials such as a thermoplastic material, a metal material, and a ceramic material as a main material, for example. Here, the "main material" means a main material for forming a shape of the three-dimensional shaped object, and means a material that occupies 50% or more by weight in the three-dimensional shaped object. The above shaping material includes those in which main materials are melted alone, and those in which some of the contained components are melted together with the main materials to form a paste.

Examples of the thermoplastic material can include the following thermoplastic resin materials.

Example of Thermoplastic Resin Material

General-purpose engineering plastics such as polypropylene resin (PP), polyethylene resin (PE), polyacetal resin (POM), polyvinyl chloride resin (PVC), polyamide resin (PA), acrylonitrile-butadiene-styrene resin (ABS), polylactic acid resin (PLA), polyphenylene sulfide resin (PPS), polyetheretherketone (PEEK), polycarbonate (PC), modified polyphenylene ether, polybutylene terephthalate, and polyethylene terephthalate, and engineering plastics such as polysulfone, polyether sulfone, polyphenylene sulfide, polyarylate, polyimide, polyamideimide, polyetherimide, and polyetheretherketone Additives such as a wax, a flame retardant, an antioxidant, or a heat stabilizer may be mixed into the thermoplastic material, in addition to a pigment, metal and ceramic. In the plasticizing unit 30, the thermoplastic material is converted into a melted state by being plasticized by the rotation of the screw 40 and the heating of the heater 58. After the shaping material generated by melting the thermoplastic material is discharged from the nozzle 62, the shaping material is cured due to a reduction in temperature.

In the three-dimensional shaping device 100, for example, the following metal material may be used as the main material instead of the above-described thermoplastic material. In this case, it is desirable that a component to be melted at the time of generating the shaping material is mixed into a powder material obtained by powdering the following metal material, and then the mixture is put into the plasticizing unit 30 as a raw material.

Examples of Metal Material

A single metal of magnesium (Mg), iron (Fe), cobalt (Co), chromium (Cr), aluminum (Al), titanium (Ti), copper (Cu), nickel (Ni), or an alloy containing one or more of these metals Examples of Alloy Maraging steel, stainless steel, cobalt chromium molybdenum, titanium alloy, nickel alloy, aluminum alloy, cobalt alloy, cobalt chromium alloy In the three-dimensional shaping device 100, a ceramic material may be used as the main material instead of the above-described metal material. Examples of the ceramic material may include an oxide ceramic such as silicon dioxide, titanium dioxide, aluminum oxide, and zirconium oxide, and a non-oxide ceramic such as aluminum nitride. When the above-described metal material or ceramic material is used as the main material, the shaping material placed on the table 210 may be cured by, for example, being irradiated with a laser or being sintered with hot air or the like.

A powder material of the metal material or the ceramic material that is put into the material supply unit 20 as a raw material may be a mixed material obtained by mixing a plurality of types of powders including a powder of a single metal or a powder of an alloy and a powder of a ceramic material. The powder material of the metal material or the ceramic material may be coated with, for example, the thermoplastic resin shown above or another thermoplastic resin. In this case, the thermoplastic resin may be melted to exhibit flowability in the plasticizing unit 30.

For example, the following solvents may be added to the powder material of the metal material or the ceramic material that is to be put into the material supply unit 20 as a raw material. The solvent can be used alone or in combination of two or more selected from the following.

Examples of Solvent

Water; (poly)alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; tetraalkylammonium acetates (for example, tetrabutylammonium acetate); and ionic liquids such as butyl carbitol acetate In addition, for example, the following binder may be added to the powder material of the metal material or the ceramic material that is to be put into the material supply unit 20 as a raw material.

Examples of Binder

Acrylic resin, epoxy resin, silicone resin, cellulose-based resin or other synthetic resin; polylactic acid (PLA), polyamide (PA), polyphenylene sulfide (PPS), polyether ether ketone (PEEK) or other thermoplastic resin D. Other Aspects The present disclosure is not limited to the embodiments described above, and may be implemented by various configurations without departing from the scope of the present disclosure. For example, in order to solve some or all of problems described above, or to achieve some or all of effects described above, technical characteristics in the embodiments corresponding to technical characteristics in aspects described below can be replaced or combined as appropriate. Unless described as essential in the present specification, the technical characteristics can be deleted as appropriate.

(1) According to a first aspect of the present disclosure, there is provided a three-dimensional shaping device that shapes a three-dimensional shaped object by laminating a layer. The three-dimensional shaping device includes: an ejection unit configured to eject a shaping material toward a table; a measurement unit configured to measure the shaping material at a measurement position separated from an ejection position of the ejection unit by a predetermined distance; a position changing unit configured to relatively move the ejection position and the measurement position with respect to the table; and a control unit. A movement range in which the measurement position is moved is wider than a shaping region where the shaping material is deposited on the table. The control unit is configured to perform a measurement of a measurement value by the measurement unit at least in a region where the movement range and the shaping region overlap each other, and control the ejection unit and the position changing unit to shape the three-dimensional shaped object in accordance with the measurement value.

In such an aspect, a movement range in which the measurement position is moved is wider than the shaping region where the shaping material is deposited on the table, and the measurement unit measures the measurement value at least in a region where the movement range and the shaping region overlap each other. Therefore, a region where the measurement is not performed can be prevented from being generated in the shaping region. As a result, it is possible to reduce the possibility that shaping accuracy is affected by a difference between a region where the shaping material is ejected from the ejection unit and a region where the measurement value is measured by the measurement unit.

(2) In the above aspect, the control unit may move the measurement position behind the ejection position in a traveling direction thereof. According to such an aspect, the measurement value can be measured with high accuracy.

(3) In the above aspect, the control unit may stop the measurement of the measurement value performed by the measurement unit in a range of the movement range that does not overlap the shaping region. According to such an aspect, the measurement range of the measurement unit can be reduced.

(4) In the above aspect, the control unit may correct the measurement value in accordance with a time difference from when the shaping material is ejected by the ejection unit to when the ejected shaping material is measured by the measurement unit, and shape the three-dimensional shaped object in accordance with the corrected measurement value. According to such an aspect, the three-dimensional shaped object can be shaped by using an appropriate measurement value.

(5) In the above aspect, the control unit may control the position changing unit to move the measurement position in accordance with the distance between the ejection position and the measurement position. According to such an aspect, the measurement unit can appropriately move in accordance with the distance between the ejection unit and the measurement unit.

(6) In the above aspect, the measurement unit may measure at least one of a temperature, a line width, and an ejection amount of the shaping material ejected by the ejection unit.

(7) In the above aspect, the control unit may control at least one of a temperature of the shaping material, an ejection amount of the shaping material, and a moving speed of the ejection position in accordance with the measurement value to shape the three-dimensional shaped object. According to such an aspect, shaping accuracy of the three-dimensional shaped object can be improved.

(8) In the above aspect, the three-dimensional shaping device may include a plasticizing unit configured to plasticize at least a part of a material to generate the shaping material, and the plasticizing unit may include a screw which is rotated around a rotation axis and has a groove forming surface in which a groove is formed; and a barrel which has a facing surface facing the groove forming surface and in which a communication hole through which the shaping material flows out is provided in the facing surface. According to such an aspect, the device can be miniaturized.

(9) According to a second aspect of the present disclosure, there is provided a method for manufacturing a three-dimensional shaped object by a three-dimensional shaping device. The three-dimensional shaping device includes: an ejection unit configured to eject a shaping material toward a table; a measurement unit configured to measure the shaping material at a measurement position separated from an ejection position of the ejection unit by a predetermined distance; and a position changing unit configured to relatively move the ejection position and the measurement position with respect to the table. The method for manufacturing a three-dimensional shaped object includes: making a movement range in which the measurement position is moved wider than a shaping region where the shaping material is deposited on the table; performing a measurement of a measurement value by the measurement unit at least in a region where the movement range and the shaping region overlap each other; and controlling the ejection unit and the position changing unit to shape the three-dimensional shaped object in accordance with the measurement value.

(10) According to a third aspect of the present disclosure, there is provided an information processing device that generates data to be used by a three-dimensional shaping device. The three-dimensional shaping device includes: an ejection unit configured to eject a shaping material toward a table; a measurement unit configured to measure the shaping material at a measurement position separated from an ejection position of the ejection unit by a predetermined distance; and a position changing unit configured to relatively move the ejection position and the measurement position with respect to the table. The information processing device includes a data generation unit configured to generate shaping data representing a movement path of the ejection position such that the measurement unit is able to perform a measurement of a measurement value at least in a region where a movement range, in which the movement position is moved, and a shaping region, where the shaping material is deposited on the table, overlap each other, the movement range being wider than the shaping region.

What is claimed is:

1. A three-dimensional shaping device that shapes a three-dimensional shaped object by laminating a layer, the three-dimensional shaping device comprising:
    an ejection unit configured to eject a shaping material toward a table;
    a measurement unit configured to measure the shaping material at a measurement position separated from an ejection position of the ejection unit by a predetermined distance;
    a position changing unit configured to relatively move the ejection position and the measurement position together with respect to the table while relatively moving the ejection unit with respect to the table along a movement path of the ejection unit; and
    a control unit configured to determine whether a shaping region in which the shaping material is deposited above the table along the movement path of the ejection unit includes a non-passing region through which the measurement position does not pass,
    the control unit being further configured to add an additional movement path of the ejection unit along which the shaping material is not deposited above the table to the movement path of the ejection unit in response to determining that the shaping region includes the non-passing region, the measurement position passing through the non-passing region while relatively moving the ejection unit with respect to the table along the additional movement path of the ejection unit, a movement region in which the measurement position is moved while relatively moving the ejection unit with respect to the table along the movement path and the additional movement path of the ejection unit covering the shaping region, and
    the control unit being further configured to perform a measurement of a measurement value by the measurement unit at least in a region where the movement region and the shaping region overlap each other, and configured to control the ejection unit and the position changing unit to shape the three-dimensional shaped object in accordance with the measurement value.

2. The three-dimensional shaping device according to claim 1, wherein
    the control unit moves the measurement position behind the ejection position in a traveling direction thereof.

3. The three-dimensional shaping device according to claim 1, wherein
    the control unit stops the measurement of the measurement value performed by the measurement unit in a range of the movement region that does not overlap the shaping region.

4. The three-dimensional shaping device according to claim 1, wherein
    the control unit corrects the measurement value in accordance with a time difference from when the shaping material is ejected by the ejection unit to when the ejected shaping material is measured by the measurement unit, and shapes the three-dimensional shaped object in accordance with the corrected measurement value.

5. The three-dimensional shaping device according to claim 1, wherein
    the control unit controls the position changing unit to move the measurement position in accordance with the distance between the ejection position and the measurement position.

6. The three-dimensional shaping device according to claim 1, wherein
    the measurement unit measures at least one of a temperature, a line width, and an ejection amount of the shaping material ejected by the ejection unit.

7. The three-dimensional shaping device according to claim 1, wherein
    the control unit controls at least one of a temperature of the shaping material, an ejection amount of the shaping material, and a moving speed of the ejection position in accordance with the measurement value so as to shape the three-dimensional shaped object.

8. The three-dimensional shaping device according to claim 1, further comprising:
    a plasticizing unit configured to plasticize at least a part of a material to generate the shaping material, wherein
    the plasticizing unit includes a screw which is rotated around a rotation axis and has a groove forming surface in which a groove is formed; and a barrel which has a facing surface facing the groove forming surface and in which a communication hole through which the shaping material flows out is provided in the facing surface.

* * * * *